United States Patent [19]

Gerfast

[11] Patent Number: 4,883,981
[45] Date of Patent: Nov. 28, 1989

[54] DYNAMOELECTRIC MACHINE HAVING IRONLESS STATOR COIL

[76] Inventor: Sten R. Gerfast, 1802 Valley Curve Rd., Mendota Heights, Minn. 55118

[21] Appl. No.: 229,137

[22] Filed: Aug. 5, 1988

Related U.S. Application Data

[63] Continuation-in-part of Ser. No. 870,432, Jun. 4, 1986, abandoned, which is a continuation-in-part of Ser. No. 660,524, Oct. 12, 1984, abandoned.

[51] Int. Cl.$^4$ .............................................. H02K 1/22
[52] U.S. Cl. .................................. 310/40 R; 310/179; 310/198; 310/46; 310/154; 310/156; 310/268
[58] Field of Search ...................................... 310/40–46, 310/154, 156, 266, 268, 179, 198

[56] References Cited

U.S. PATENT DOCUMENTS

| | | | |
|---|---|---|---|
| 3,090,880 | 5/1963 | Raymond | 310/268 |
| 3,097,319 | 7/1963 | Baudot | 310/268 |
| 3,109,114 | 10/1963 | Baudot | 310/268 |
| 3,144,574 | 8/1964 | Baudot | 310/268 |
| 3,159,764 | 12/1964 | Baudot | 310/268 X |
| 3,219,861 | 11/1965 | Burr | 310/268 |
| 3,230,406 | 1/1966 | Baudot | 310/268 X |
| 3,312,846 | 4/1967 | Baudot | 310/266 |
| 3,375,386 | 3/1968 | Hayner et al. | 310/268 |
| 3,575,624 | 4/1971 | Keogh | 310/268 |
| 3,619,899 | 11/1971 | Takeda et al. | 310/268 X |
| 4,340,833 | 7/1982 | Sudo et al. | 310/268 |

Primary Examiner—Mark O. Budd
Attorney, Agent, or Firm—Robert E. Granrud

[57] ABSTRACT

A dynamoelectric machine has a brushless, substantially ironless stator coil of a long electrical wire conductor which comprises a large number of straight legs which are grouped into spaced bundles to form a thin-walled structure that may be cylindrical as in FIG. 1 or flat as in FIG. 6. The thin-walled structure may be supported by a plastic framework or may be adhered to a thin, correspondingly cylindrical or flat, ferromagnetic sheet. A ferromagnetic sheet not only supports the coil, but also enhances efficiency by providing a return path for electromagnetic flux. A plastic framework is lighter in weight.

17 Claims, 5 Drawing Sheets

DYNAMOELECTRIC MACHINE HAVING IRONLESS STATOR COIL

CROSS REFERENCE TO RELATED APPLICATIONS

This application is a continuation-in-part of copending application Ser. No. 870,432, filed June 4, 1986, now abandoned which in turn was a continuation-in-part of application Ser. No. 660,524, filed Oct. 12, 1984, now abandoned.

The dynamoelectric machine of the invention is particularly useful when employing the permanent magnet rotor disclosed in applicant's application Ser. No. 660,523, filed Oct. 12, 1984, now U.S. Pat. No. 4,814,654.

FIELD OF THE INVENTION

The invention concerns dynamoelectric machines, specifically motors and generators (including alternators). The invention especially concerns dynamoelectric machines having brushless, substantially ironless stator coils and permanent magnet rotors.

BACKGROUND ART

In many small dynamoelectric machines, the stator comprises a coil and the rotor comprises a permanent magnet. In almost every such dynamoelectric machine, the coil is wound on a stack of laminated steel plates, edges of which form a cylinder at which the associated flux is concentrated, and that working face approximately coincides with the working face of the rotor. Production of the laminated steel plates requires expensive tooling, and their assembly with insulating sheets can also be expensive. Costs of producing prototypes or small numbers of such stators can be excessive. Among other problems are the large weight of the steel plates and the eddy current losses.

Because of such problems, so-called ironless stator coils have been developed, especially for applications where reduction in inertia or weight is important. Usually such stator coils are associated with iron supports, as in U.S. Pat. No. 4,340,833 (Sudo et al.), FIGS. 3 and 4 of which show a motor that is indicated to have a metal case, probably iron. The rotor of that motor has alternating N and S poles having working faces of equal angular width and equal length. The stator of that motor is brushless and substantially ironless and comprises a first phase coil and a second phase coil, each of which surrounds the rotor. The Sudo patent says:

"(T)he motor coils are normally formed by winding conductor around winding frames, removing the resulting coils from the winding frames, and then installing them in the motor case so that they are in a predetermined arrangement relation to one another. For this reason the efficiency of the motor is decreased with miniaturization of the motor since the space occupied by the coil conductor relative to the external size of the coil becomes small. Moreover, with miniaturization of the motor, the assembly work by which the coils made one by one are arranged correctly in the relationships shown in FIG. 2 and FIG. 4 becomes very difficult. For this reason there was a limit in the extent to which the motor could be miniaturized and the miniaturization was very expensive" (col. 5, lines 25-40).

The Sudo patent's solution to this problem is to form the two coils on opposite faces of an insulating sheet.

DISCLOSURE OF INVENTION

The invention concerns a dynamoelectric machine which can be miniaturized while avoiding the problems outlined in the above-quoted passage of the Sudo patent. The novel dynamoelectric machine can involve either direct or alternating current operation and includes (1) a rotor comprising alternating N and S poles having working faces of equal length and equal angular width, (2) a brushless, substantially ironless stator comprising (a) a single coil forming a large number of legs that are coextensive with the length of each working face of the rotor,
grouped into a plurality of spaced bundles, the working faces of which are equally spaced from the working faces of the rotor, and
interconnected between adjacent bundles to form a single conductor having two free ends, and (b) means for connecting said free ends into a circuit such that current can flow through every leg of each bundle at any instant in the same direction, and electromagnetic flux associated with that current directly interacts with flux of the rotor.

By "leg" is meant each portion of said conductor extends in the direction of the length of the working faces of the rotor. By "substantially ironless" is meant that the coil can either be ironless or its nonworking face can be adhered to a thin ferromagnetic sheet that is less than 0.5 mm in thickness and not only serves as a support for the coil, but enhances efficiency by providing a return path for electromagnetic flux. There might be undesirably large eddy current losses if the ferromagnetic sheet were much thicker than 0.5 mm. Also, the dynamoelectric machine would become undesirably heavy for many uses if the ferromagnetic sheet were much thicker than 0.5 mm.

To minimize losses, the legs should comprise the major portion of the coil. Portions of the coil that directly interconnect two legs of adjacent bundles have no other function.

Among its advantages, the invention provides motors having reduced weight for such uses as driving cooling fans of portable or air-borne devices. By being substantially ironless (i.e., not being wound on laminated iron or steel plates), tremendous freedom of design is possible. For example, the conductor can have as many bundles of legs and legs per bundle as the designer wishes. In addition, the invention provides significant cost advantages, both in tooling and in assembly. Those cost advantages are especially important in building prototypes or small numbers of motors.

The brushless, substantially ironless stator coil of the dynamoelectric machine of the invention can be economically constructed by winding a wire conductor around protrusions from a flat board to form a daisy-like coil which, after applying adhesive to hold the coil turns together, may be reshaped into a thin-walled structure which either is cylindrical or flat. In either case, that structure may be adhered to a thin, flat ferromagnetic sheet or panel for reasons noted above or to an electrically insulative backing such as a plastic body.

Instead of using a wire, the conductor can be formed on a flexible, electrically insulative backing. For example, the conductor can be etched or die-cut from the conductive metal layer of flexible circuit stock, or it can be deposited onto insulative backing, such as by printing with electrically conductive ink.

Ideally, each bundle of the coil would have only a monolayer of the conductor to place every leg as close as possible to the magnet segments, thus utililizing the magnetic flux where it is strongest. However, it usually is necessary to employ at least ten legs per bundle, thus resulting in a plurality of layers of the conductor in each bundle. Even when each bundle of legs includes several layers of the conductor, the coil can be called "thin-walled."

THE DRAWING

In the drawing,

FIG. 1 is a schematic perspective of a motor of the invention incorporating a brushless, ironless stator coil that surrounds a rotor;

FIG. 2 schematically illustrates the formation of the stator coil shown in FIG. 1;

Figure 1:
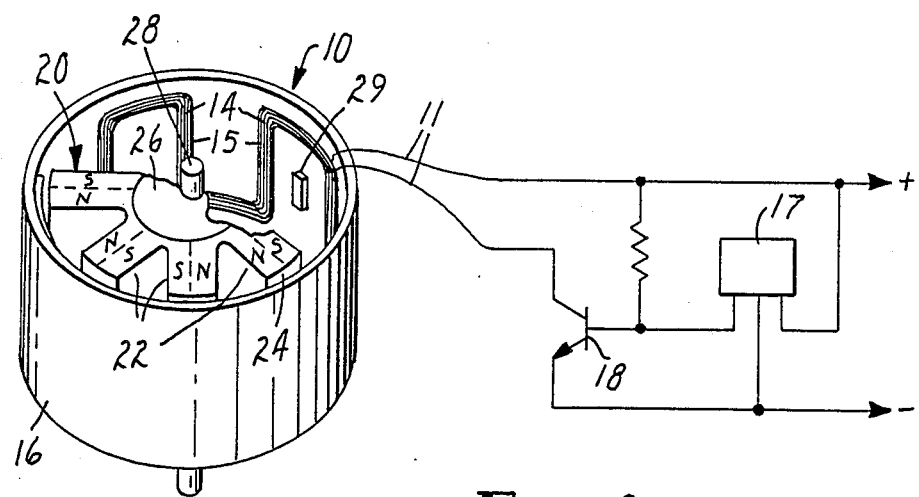
Figure 2:
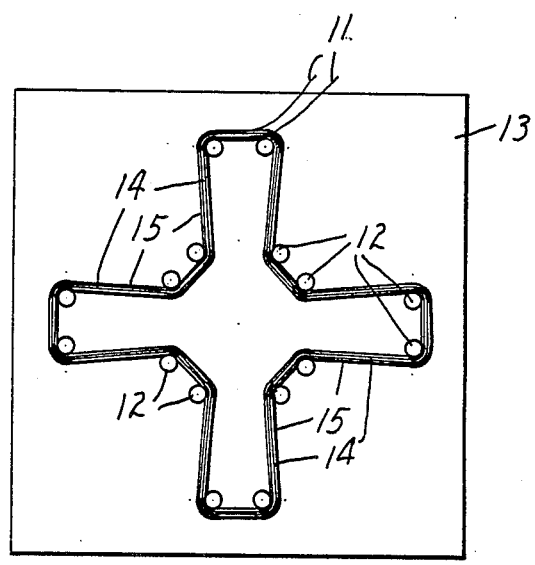

The brushless, ironless coil of the stator 10 of the motor shown in FIG. 1 may be made by winding a wire conductor 11 around pins 12 protruding from a flat board 13 shown in FIG. 2. In making a prototype model of the motor, fifty turns of copper wire having a diameter of 0.29 mm formed a single daisy-like coil wherein the major portion of the wire lay in substantially straight legs 14 which were grouped into eight spaced compact bundles 15, each having a radial thickness of approximately 2.5 mm. As can be seen in FIG. 1, each of the legs was interconnected between adjacent bundles 15 to form a single conductor having two free ends. A room-temperature-curing epoxy resin was used to adhere the turns of the coil together, followed by shaping the impregnated coil into the thin-walled cylindrical structure shown in FIG. 1 and adhering it to the inner surface of a cylindrical ferromagnetic tube 16. The tube 16 was formed from 0.36-mm thick ferromagnetic silicon steel sheet to have an inner diameter of 3.8 cm. Each of the eight bundles 15 of the shaped coil extended axially with respect to the tube 16 and was 2.9 cm in length. The free ends of the conductor were then connected to a circuit including a Hall-effect device 17 (which was adhered to the inner face of the tube 16) and a transistor 18 to provide the complete stator 10. This arrangement assured that the conductors would be energized (pulsed) at the appropriate angular position of the rotor of the motor.

The rotor 20 of the prototype motor constructed as shown in FIG. 1 comprised a permanent magnet 22 which had been formed to have eight sectors, each of which was magnetized to have opposite poles of equal angular width and extending across each half of its working face 24, with adjacent halves of adjacent working faces having like polarity. The magnet 22 was mounted on an aluminum drum 26 having a steel shaft 28. The spacing between the bundles 15 and each working face 24 was about 0.25 mm (average spacing 1.5 mm).

As can be seen in FIG. 1, each of the N and S poles of the rotor 20 has an angular width approximating that of each of the bundles 15.

A small permanent magnet 29 was adhered to the inner surface of the ferromagnetic tube 16 of the stator 10 to position the south pole of one of the working faces 24 squarely opposite the Hall-effect device whenever the power was off, thus assuring rotation upon connecting to power. The magnet 29 of the prototype motor comprised barium ferrite platelets dispersed in a flexible binder.

The prototype motor of FIG. 1, when used to drive a fan by connecting it to 12 volts DC, drew 0.4 Amperes at 3250 rpm.

Figure 3:
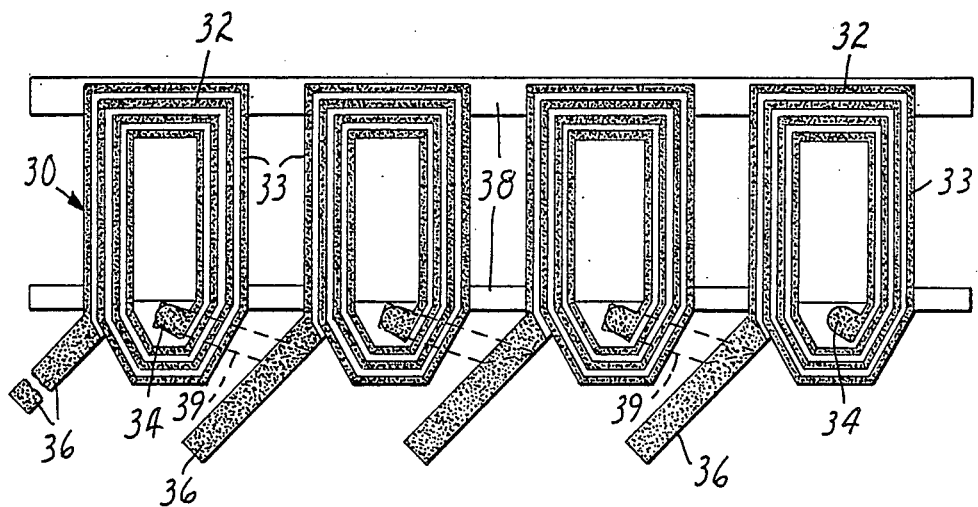
FIG. 3 is a schematic plan view of a conductor useful in an ironless stator coil that could replace that used in the motor of FIG. 1.

Turning to FIG. 3, a sheet 30 of flexible circuit stock has been die-cut, and its thin copper layer has been etched to form four spiral conductors 32, each of which forms two sets of straight legs 33 and terminates at a connector pad 34 and a connector tab 36. The four conductors 32 are held together by remanents 38 of the insulative backing of the flexible circuit stock. To form a stator similar to that shown in FIG. 1, three of the connector tabs 36 are folded and electrically connected (e.g., soldered) to the closest connector pads 34 (as indicated by dotted lines 39) to form a single segmented conductor. The same process is repeated with a number of sheets identical to sheet 30. Then the sheets are stacked, with corresponding legs 33 superimposed to form eight spaced bundles, each extending axially. The outermost sheet is adhered to a thin-walled, cylindrical, ferromagnetic tube, thus providing a serpentine coil which is equivalent to that of FIG. 1. The unconnected connector tab 36 of the outer sheet is electrically connected to the unconnected connector pad 34 of the adjacent sheet, and so forth, until all of the spiral conductors are connected in series to provide a single segmented conductor, the free ends of which are the unconnected connector pad 34 of the outer sheet and the unconnected connector pad 36 of the inner sheet. Then those two unconnected connector pads are connected to a circuit as in FIG. 1 to provide a complete stator.

When the etched sheet 30 is used in a motor, one portion of the coil formed by its spiral conductors could be used as a starter winding, and another portion of the coil providing a running winding which can be interconnected with a circuit as in FIG. 1 to provide a stator.

A prototype stator coil has been constructed from sheets of flexible circuit stock having a flexible polyimide backing about 51 micrometers in thickness and a copper layer about 71 micrometers in thickness. The prototype stator coil was substantially as shown in FIG. 3 except that its copper layer was etched to provide eleven narrow, closely spaced strands of conductor (as opposed to the four shown in FIG. 3) in each set of the legs 33. Each strand was about 0.3 mm in width with 0.15 mm spacings. Four sheets were then interconnected as described to provide 44 strands or legs in each axial bundle of the coil.

Figure 4:
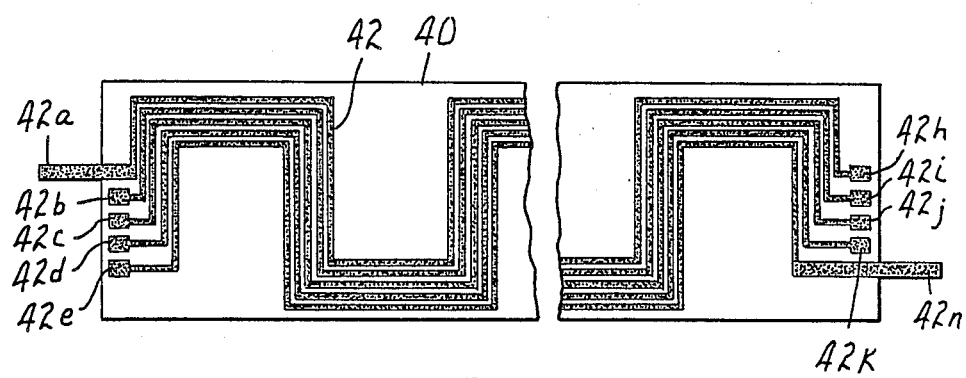
FIG. 4 is a schematic plan view of a conductor useful in an ironless stator coil that also could replace the stator coil in the motor of FIG. 1.

Referring to FIG. 4, the copper layer of a flexible circuit stock has been etched to form a long strip 40 of five parallel conductors 42, each having a serpentine path which may form many sets of straight legs, five sets being shown. A stator coil similar to that shown in FIG. 1 may be formed from a very long strip 40, e.g., one having 48 sets of legs. Such a strip of etched circuit stock may be wound upon itself to superimpose the ninth set of legs over the first, the tenth over the second, and so forth, thus forming a thin-walled cylindrical structure similar to that of FIG. 1. This groups the legs into forty-strand bundles. Upon doing so, the ends of the strip 40 would be folded to allow the connector pad 42b at one end of the strip to be electrically connected to the connector pad 42h at the opposite end of the strip, and so forth, until only the connector pads 42a and 42n are unconnected. These two unconnected pads (which are free ends of the serially electrically interconnected conductors 42) would then be connected to a circuit such as in FIG. 1 to form a complete stator.

Alternatively, the strip 40 may be relatively short, e.g., have eight sets of legs, and two or more such strips may be superimposed and formed into a thin-walled cylindrical structure with the unconnected pads of each strip connected to unconnected pads of adjacent convolutions, thus forming a stator coil comprising a single serpentine path through the segmented conductor provided by the individual conductors of every strip of the cylindrical structure. The free ends of one individual conductor of each of the inner and outer sheets may be interconnected, leaving one connector free at each end to be connected to circuitry to provide a complete stator.

Figure 5:
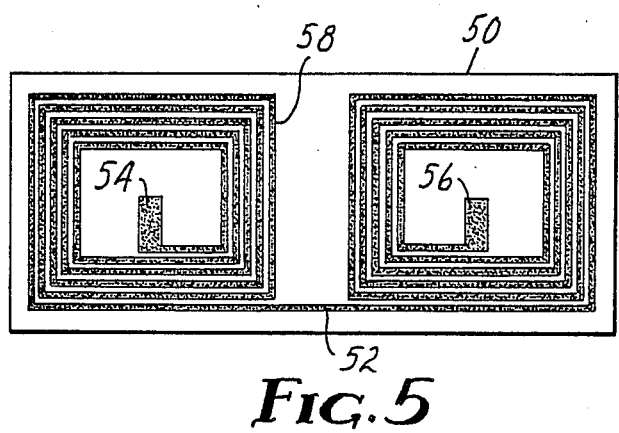
FIG. 5 is a schematic plan view of a conductor useful in an ironless stator coil that also could replace the stator coil in the motor of FIG. 1.

Shown in FIG. 5 is a sheet 50 of flexible circuit stock, the copper layer of which has been etched to form a single conductor 52 extending through two spirals terminating at two central connector pads 54 and 56. To form a thin-walled cylindrical stator coil, the connector pad 56 of a sheet identical to sheet 50 is superimposed over and electrically connected to the connector pad 54 of sheet 50, and the process is repeated with a large number of identical sheets. The assembly is then wound on itself so that every set 58 of legs is radially aligned with corresponding sets of legs of the other sheets to form a plurality of spaced bundles, each extending axially. Then the unconnected connector pad 56 of the outer sheet and the unconnected connector pad 54 of the inner sheet (which are free ends of the serially electrically interconnected conductors 52) are connected to circuitry providing a complete stator.

Although prototypes of each of the conductors of FIGS. 3, 4 and 5 have been etched from flexible circuit stock, each of those figures also illustrates conductors deposited on electrically insulative backings.

Figure 6:
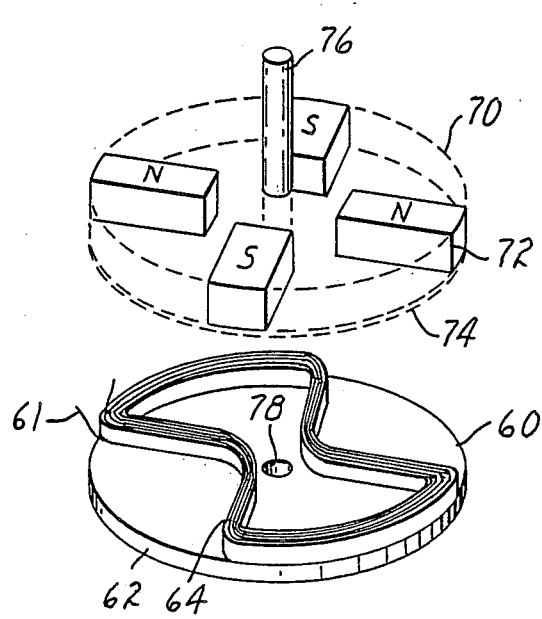
FIG. 6 is an exploded schematic perspective of a dynamoelectric machine incorporating a stator coil of the invention, which coil has a planar working face.

To make the stator 60 of the motor shown in FIG. 6, a wire conductor 61 is repeatedly wound around pins, impregnated with adhesive, and then adhered to an insulative panel 62 to form the illustrated thin-walled flat stator coil having a 2-petal daisy-like shape. The straight legs of the conductor 61 form four spaced bundles 64, each of which extends substantially radially. The free ends of the conductor are connected to circuitry providing a complete stator 60.

The rotor 70 of the motor shown in FIG. 6 comprises four permanent magnets 72, each magnetized as shown and adhered to a thin, flat ferromagnetic panel 74 which provides a return path for associated flux. The panel 74 is mounted on a central steel shaft 76 which is journalled through a central opening 78 in the insulative panel 62 of the stator 60.

Figure 7:
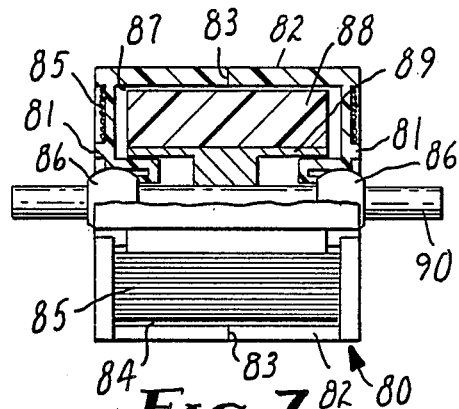
FIG. 7 is a schematic plan view, partially broken away to a central section, of a dynamoelectric machine of the invention.
Figure 8:
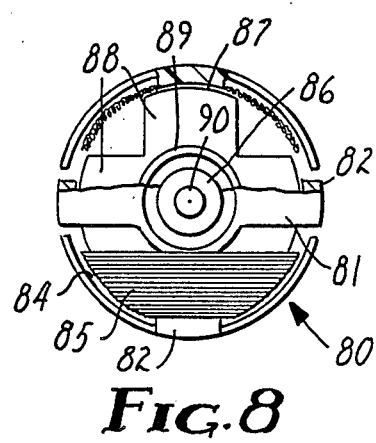
FIG. 8 is an end view, partially broken away, of the dynamoelectric machine shown in FIG. 7.

The stator of the dynamoelectric machine 80 shown in FIGS. 7 and 8 has a plastic body molded in identical halves, each consisting of a pair of end caps 81 and four projections 82, the junctures 83 of which are fastened together, for example by ultrasonic welding. A spherical bearing 86 is snapped into a cavity at the center of each end cap 81. Each end cap 81 is formed with four recesses 84 for receiving a large number of turns of copper wire 85 to form a pair of toroids that together have four compact bundles of legs, each leg extending axially between the two end caps 81. The legs are interconnected between adjacent bundles to form a thin-walled stator coil having two free ends (not shown) which can be connected to a circuit as in FIG. 1 to provide a complete stator.

As shown in section in FIG. 8, the wall of the stator coil has about two layers of wire conductor 85. The legs of each bundle are closely spaced from the cylindrical working faces 87 of four permanent-magnet segments 88 of the rotor which is surrounded by the stator coil to provide the dynamoelectric machine 80. The segments 88 are mounted on a hub 89 which in turn is mounted on a steel shaft 90 that is journalled in spherical bearings 86, thus aligning the spherical bearings.

Figure 12:
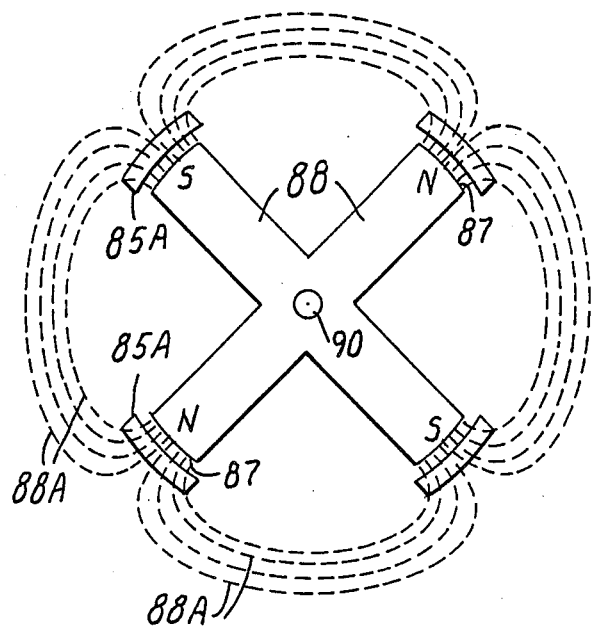
FIG. 12 is a schematic central cross section of the dynamoelectric machine, of FIGS. 7 and 8.

In FIG. 12, each of the four permanent-magnet segments 88 of the rotor of the dynamoelectric machine 80 is shown directly opposite to one of the four compact bundles 85A of legs of the wire 85, and it can be seen that the angular widths of the working faces 87 of the rotor and the working faces of the stator bundles 85A are of approximately equal angular width and are equally spaced. In the position shown in FIG. 12, each leg of each of the bundles extends substantially orthogonally to lines of magnetic flux 88A that emanate substantially radially from the adjacent cylindrical working face 87 of the rotor. When one bundle 85A of legs of the stator coil is adjacent a N pole of the rotor, each adjacent bundle of legs of the coil is adjacent a S pole.

Figure 9:
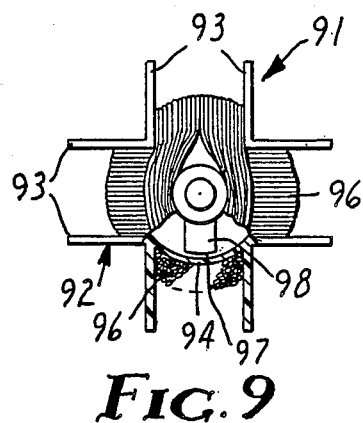
FIG. 9 is a schematic end view, partially broken away, of another dynamoelectric machine of the invention.

The stator of the dynamoelectric machine 91 shown in FIG. 9 has a frame 92 which may be molded as a single plastic piece and includes eight axially extending walls 93 and a tubular hub 94. A large number of turns of copper wire 96 are wound between the walls 93 against the hub 94 to form a pair of toroids that together have four compact bundles of axially extending legs. The bundles are interconnected to form a thin-walled stator coil having two free ends (not shown) which can be connected to a circuit as in FIG. 1 to provide a complete stator. As shown in section in FIG. 9, the wall of the stator coil has about five layers of wire conductor 96. The hub 94 is very thin so that the legs of each bundle are closely spaced from the working faces 97 of a permanent-magnet segment 98 of the rotor which is surrounded by the stator coil to provide the dynamoelectric machine 91.

Figure 13:
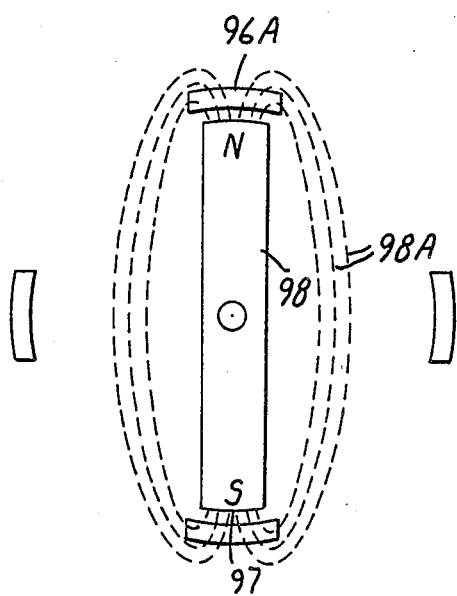
FIG. 13 is a schematic central cross section of the dynamoelectric machine of FIG. 9.

In FIG. 13, the rotor of the dynamoelectric machine 91 is shown with only two permanent-magnet segments 98 even though a rotor having four permanent-magnet segments like that of FIGS. 8, 9 and 12 would provide greater power. Each of the two working faces of the permanent-magnet segments 98 is shown directly opposite to one of the four bundles 96A of legs of the wire 96. In this position, each leg of two of the bundles 96A extends substantially orthogonally to lines of magnetic flux 98A that emanate substantially radially from the adjacent working face 97, each of which is a N or S pole.

Figure 10:
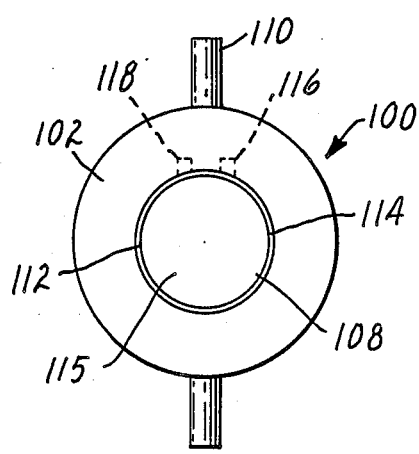
FIG. 10 is a schematic plan view of another dynamoelectric machine of the invention.
Figure 11:
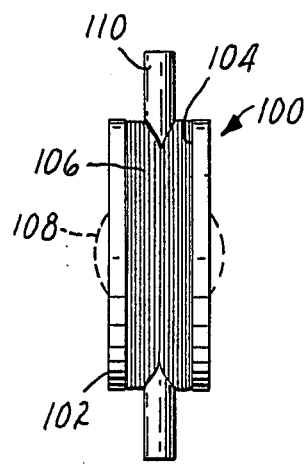
FIG. 11 is an end view of the dynamoelectric machine shown in FIG. 10.

The stator of the dynamoelectric machine 100 shown in FIGS. 10 and 11 has a toroidal frame 102 which may be molded as a single piece of plastic. The frame 102 is formed with an annular channel 104 in which is wound copper wire 106 to form a thin-walled stator coil having a large number of circular turns to form a toroid. Two free ends (not shown) of the stator coil can be connected to a circuit as in FIG. 1 to provide a complete stator. Although the wire conductor 106 forms a single bundle, it may be thought of as forming two compact bundles of legs extending along opposite sides of a permanent magnet 108 which is mounted on a steel shaft 110 that is journalled in the frame 102 of the stator to provide the rotor which is surrounded by the stator coil to provide the dynamoelectric machine 100. The permanent magnet 108 has a truncated spherical shape and is magnetized to have a N pole extending across one working face 112 and a S pole across its other working face 114. Less preferredly, it could be magnetized to have opposite poles extending across each of its working faces 112 and 114, and a single pole extending across each of its flat faces 115. The frame 102 is very thin at the base of its annular channel 104 so that the turns of wire 106 are closely spaced from the working faces 112 and 114.

Figure 14:
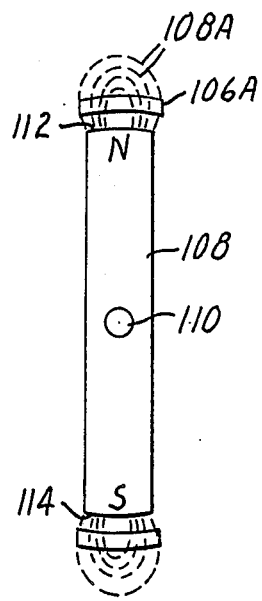
FIG. 14 is a schematic central cross section of the dynamoelectric machine of FIGS. 10 and 11.

In FIG. 14, each of the truncated spherical working faces 112 and 114 of the permanent magnet 108 of the rotor of the dynamoelectric machine 100 is shown directly opposite to one of the two compact bundles 106A of legs of the wire 106. Each of the bundles 106A preferably is shaped to provide a truncated spherical shape that approximates the shapes of the working faces 112 and 114 of the rotor.

In each of the dynamoelectric machines of FIGS. 7-14, a permanent magnet (such as the magnet 116 shown in FIG. 10) may be embedded in the stator to position the rotor for starting when the power is off. A Hall-effect device (such as the device 118 shown in FIG. 10) also may be embedded in the stator.

EXAMPLE 1

(Comparative Test)

This test compared a motor equipped with a stator coil of the invention (here called "Motor A") with a purchased motor of the prior art (here called "Motor P"). Motor P was a cost-effective shaded pole motor for a fan. Its stator comprised a coil of No. 30 copper wire coil (11 mils in diameter) wound upon steel laminations. Its rotor also employed steel laminations in conjunction with permanent magnets. Motor P drew 16 watts at 1250 r.p.m. at 110 volts a.c.

Motor A was made by replacing the rotor and stator of Motor P with a rotor and stator, each of which had been built by hand. The stator coil of Motor A was made as illustrated in FIG. 1 of the drawing except that its legs 14 were grouped into twelve spaced bundles 15, each containing 150 turns of No. 30 copper wire. As in FIG. 1, the coil was adhered to the inner surface of a ferromagnetic tube 16, which was silicon steel. The rotor of Motor A was a plastic drum, to the external surface of which was adhered 12 permanent magnets as disclosed in my above-cited patent application Ser. No. 660,523, filed Oct. 12, 1984.

Motor A drew only 7.2 watts when the voltage was reduced to drive the same fan at the same 1250 r.p.m., a 55% improvement in efficiency attributable in part to the stator coil of the present application and in part to the rotor of Ser. No. 660,523.

That the stator coil of Motor A substantially contributed to this improvement in efficiency is evident from two differences compared to the stator of Motor P. First, the stator coil of Motor A provides a shorter electromagnetic flux path in conjunction with the rotor than does the stator of Motor P. Second, the absence of steel laminations in the novel stator coil avoids the eddy current and hysteresis losses inherent in the stator of Motor P.

By eliminating the steel laminations of Motor P, Motor A was only half the weight, even though both employed the same aluminum casing. The lesser weight was due almost entirely to the absence of iron laminations from both the stator and rotor of Motor A. These improvements in efficiency and weight were accomplished with no sacrifice in reliability or durability.

EXAMPLE 2

A miniature motor as made substantially as illustrated in FIGS. 10, 11 and 14, except that the toroidal frame 102 was eliminated in order to minimize the spacing between the working faces of the rotor and the stator coil. The rotor was formed from a cylindrical sintered neodymium/iron/boron magnet having an OD of 0.3 inch and was drilled to have a 0.064-inch bore. Its working faces were machined to become substantially spherical except that their curvature in the truncated direction was a little less than a true sphere.

The stator was made by winding copper magnet wire 0.007-inch-diameter on a spool having the same shape as the rotor. After spraying silicone on the spool, 250 turns were wound on one side of the substantially spherical face of the spool, cemented together with a solvent-type cement ("Duco"), and pushed off the spool. Another 250 turns were then wound on the other side of that face of the spool, cemented together, and pushed off.

After forming a tiny pocket in the OD of one of the windings, an electrical circuit as shown in FIG. 1 (Sprague 5275K) was cemented into the pocket. The two windings were brought together like the shell halves of a walnut and cemented to a plastic framework into which the rotor had been inserted. A pin 0.062-inch in diameter was inserted into the bore of the rotor and into 0.064-inch bores in the framework on either side of the rotor. The rotor was cemented to the pin, leaving the pin free to rotate in the bores of the framework. The spacing between the working faces of the rotor and the stator coil was 0.01 inch.

One lead of each winding was soldered to the other, and the other two leads were soldered to the leads of the electrical circuit to provide a motor having a 500-turn stator coil of annular shape, the inner face of which was substantially spherical. The motor weighed about ten grams.

Onto one end of the pin was mounted a 5-blade fan impeller made as shown in U.S. Pat. No. 4,610,601 (Gerfast), the blades of which extended at about 45° to the axial direction. The OD of the impeller was 1.5 inches. At 5 volts d.c., the impeller rotated at 7000 rpm while drawing 0.25 Amperes and was adjudged to be moving sufficient air to cool a typical personal computer. Fans now used for that purpose are something like 5 to 10 times greater in weight.

I claim:

1. A dynamoelectric machine comprising
   (1) a rotor comprising alternating N and S poles having working faces of equal length and equal angular width and
   (2) a brushless, substantially ironless stator comprising
      (a) a continuous electrical conductor having two free ends, which conductor is grouped into compact bundles that are spaced from each other and closely spaced from the working faces of the rotor, each bundle (i) containing at least four layers of the conductor, (ii) being coextensive with said length of the working faces of the rotor, and (iii) being directly opposed to an N pole of the rotor when an adjacent bundle is directly opposed to an S pole of the rotor, and
      (b) means for connecting said free ends into a circuit such that at any instant current can flow through portions of the conductor within each bundle in the same direction, which direction is opposite to current flowing through portions of the conductor within each adjacent bundle, and electromagnetic flux associated with that current directly interacts with flux of the rotor.

2. A dynamoelectric machine as defined in claim 1 wherein each bundle has approximately the same angular width as does each working face of the rotor.

3. A dynamoelectric machine as defined in claim 1 wherein the electrical conductor surrounds the rotor.

4. A dynamoelectric machine as defined in claim 3 wherein the electrical conductor forms a cylinder that is adhered to the inner wall of a thin cylindrical tube.

5. A dynamoelectric machine as defined in claim 4 wherein said tube comprises a ferromagnetic sheet not greater than 0.5 mm in thickness.

6. A dynamoelectric machine as defined in claim 3 wherein the electrical conductor is toroidal.

7. A dynamoelectric machine as defined in claim 1 wherein the electrical conductor substantially lies in a plane and its nonworking face is adhered to a flat ferromagnetic sheet not greater than 0.5 mm in thickness.

8. A dynamoelectric machine as defined in claim 1 wherein the electrical conductor is supported by the exterior ssurface of a plastic body.

9. A dynamoelectric machine as defined in claim 3 wherein the conductor follows a serpentine path sequentially through adjacent legs.

10. A dynamoelectric machine as defined in claim 1 wherein the electrical conductor is a copper wire.

11. A dynamoelectric machine as defined in claim 1 wherein the electrical conductor is an etching of circuit stock.

12. A dynamoelectric machine comprising
    (1) a rotor comprising alternating N and S poles having working face that rotate around the rotor axis to generate a cylinder or a sector of a sphere, which working faces are of equal axial length and equal angular width, and
    (2) a brushless, substantially ironless stator comprising
       (a) a continuous electrical conductor having two free ends and forming at least one toroid that surrounds and is closely spaced from the cylinder or spherical sector generated by the working faces of the rotor, which conductor is grouped into compact bundles that are spaced from each other, each bundle (i) containing at least four layers of the conductor, (ii) being coextensive with said axial length of the working faces of the rotor, and (iii) being directly opposed to an N pole of the roto when an adjacent bundle is directly opposed to an S pole of the rotor, and
       (b) means for connecting said free ends into a circuit such that at any instant current can flow through portions of the conductor within each bundle in the same direction, which direction is opposite to current flowing through portions of the conductor within each adjacent bundle, and electromagnetic flux associated with that current directly interacts with flux of the rotor.

13. A dynamoelectric machine as defined in claim 12 wherein the working faces of the rotor lie in a cylinder, and each bundle extends parallel to the axis of rotation of the rotor.

14. A dynamoelectric machine as defined in claim 13 wherein each bundle has the same angular offset from adjacent bundles as do adjacent poles of the rotor.

15. A dynamoelectric machine as defined in claim 12 wherein the rotor has two working faces that lie in a sphere and are diametrically opposed, and there are two of said compact bundles which together form an annulus that surrounds the sphere.

16. A dynamoelectric machine as defined in claim 15 wherein the inner surface of said annulus is substantially spherical.

17. A dynamoelectric machine comprising
    (1) an ironless rotor comprising alternating N and S poles having working faces of equal length and equal angular width and
    (2) an ironless brushless stator comprising
       (a) a single length of an electrical wire having two free ends, which wire is gathered into spaced compact bundles that are closely spaced from the working faces of the rotor, each bundle (i) containing at least four layers of the conductor, (ii) being coextensive with said length of the working faces of the rotor, and (iii) being directly opposed to an N pole of the rotor when an adjacent bundle is directly opposed to an S pole of the rotor, and
       (b) means for connecting said free ends into a circuit such that that at any instant current can flow through portions of the conductor within each bundle in the same direction, which direction is opposite to current flowing through portions of the conductor within each adjacent bundle, and electromagnetic flux associated with that current directly interacts with flux of the rotor.

* * * * *